United States Patent [19]

King et al.

[11] 3,925,445

[45] *Dec. 9, 1975

[54] HYDROCYANATION OF OLEFINS

[75] Inventors: Charles Morgan King, Wilmington, Del.; William Carl Seidel, Orange, Tex.; Chadwick Alma Tolman, Wilmington, Del.

[73] Assignee: E. I. Du Pont de Nemours & Company, Wilmington, Del.

[ * ] Notice: The portion of the term of this patent subsequent to Mar. 19, 1991, has been disclaimed.

[22] Filed: Oct. 17, 1973

[21] Appl. No.: 407,265

Related U.S. Application Data

[63] Continuation-in-part of Ser. No. 168,352, Aug. 2, 1971, Pat. No. 3,798,256.

[52] U.S. Cl.......... 260/465 R; 260/346.3; 260/464; 260/465 C; 260/465 D; 260/465 E; 260/465 F; 260/465 H; 260/465.1; 260/465.3; 260/465.4; 260/465.5 R; 260/465.6; 260/465.8 R

[51] Int. Cl.²....................................... C07C 120/02

[58] Field of Search........... 260/464, 465 C, 465.3, 260/465 E, 465.4, 465 D, 465.1, 465.8 R, 465 H, 465.5 R, 465 R, 465 F, 465.6, 346.3

[56] References Cited

UNITED STATES PATENTS

| | | | |
|---|---|---|---|
| 3,686,264 | 8/1972 | Albanese et al. | 260/465.3 |
| 3,697,578 | 10/1972 | Pasquino et al. | 260/465.9 |
| 3,766,231 | 10/1973 | Gosser et al. | 260/465.8 R |
| 3,766,237 | 10/1973 | Chia et al. | 260/465.3 |
| 3,773,809 | 11/1973 | Walter | 260/465.8 R |
| 3,778,462 | 12/1973 | Taylor et al. | 260/465.8 R |
| 3,798,256 | 3/1974 | King et al. | 260/465.8 R |

*Primary Examiner*—Joseph P. Brust

[57] ABSTRACT

A process for hydrocyanating an ethylenically unsaturated organic compound in the presence of an olefin-bonded zerovalent nickel complex of the formula $Ni(PXYZ)_2A$, wherein X is OR, Y and Z are R or OR and R is an alkyl or aryl radical, a given PXYZ ligand having a cone angle with an average value between 130° and 170°; "A" is an ethylenically unsaturated organic compound containing 2 to 20 carbon atoms.

A Lewis acid such as $AlCl_3$, $ZnCl_2$ or $(C_6H_5)_3B$ may be used in conjunction with the complex.

12 Claims, No Drawings

HYDROCYANATION OF OLEFINS

CROSS REFERENCE TO RELATED APPLICATION

This is a continuation-in-part of application Ser. No. 168,352, field Aug. 2, 1971 by Charles M. King, William C. Seidel and Chadwick A. Tolman, claims of which issued in U.S. Pat. No. 3,798,256.

BACKGROUND OF THE INVENTION

It is known that the addition of hydrogen cyanide to double bonds adjacent to an activating group such as a nitrile or a carboxy group proceeds with relative ease. However, the addition of hydrogen cyanide to non-activated double bonds proceeds only with difficulty if at all and normally requires the use of high pressure of about 1,000 psi or more and high temperatures in the range of 200° to 400°C.

In U.S. Pat. No. 2,571,099 an improvement over this technique is described which involves the use of nickel carbonyl with or without the addition of a tertiary aryl phosphine or arsine. Relatively poor yields are obtained with this process along with the production of a relatively high precentage of undesirable polymeric products. More recently processes for effecting hydrocyanation under mild conditions with tetrakis zero valent nickel complexes derived from phosphorus containing ligands have been described in U.S. Pat. Nos. 3,496,215, 3,496,217 and 3,496,218. An improved process for hydrocyanating olefins, particularly 3-pentenenitrile or 4-pentenenitrile, in the presence of a zerovalent nickel complex containing less than four phosphorus ligands is claimed in allowed copending patent application Ser. No. 168,352. Hydrocyanation of olefins other than 3-pentenenitrile on 4-pentenenitrile was also disclosed in that application. The purpose of this application is to make claim to hydrocyanation of such olefins by the improved process.

SUMMARY OF THE INVENTION

The present invention provides a process which produces organic nitriles in high yields under mild conditions by reaction of olefins with hydrogen cyanide in the presence of zerovalent nickel compounds wherein nickel is complexed with two esters of trivalent phosphorus along with an olefin or olefinic compound.

The process of the present invention is generally applicable to unsaturated organic compounds containing from 2 to 20 carbon atoms having at least one ethylenic carbon-carbon double bond. The unsaturated organic compounds are of the group consisting of aliphatic and aromatic hydrocarbons and aliphatic and aromatic hydrocarbons containing functional groups consisting of

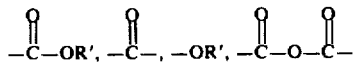

and $-NR'_2$ wherein R' is hydrogen or an alkyl or aryl radical having up to 10 carbon atoms and each open bond other than that required for connection of the functional group to the olefinic radical of the group consisting of hydrogen, aliphatic and aromatic hydrocarbon radicals, wherein the carbon-carbon double bond is separated from the aforesaid functional group by at least one carbon atom.

Suitable unsaturated compounds include monoolefins such as ethylene, propylene, butene-1, pentene-2, hexene-3, hexene-2, hexene-1, methylenecyclopentane, cyclohexene, styrene or methyl styrene and the monoolefinic hydrocarbons containing functional groups, as illustrated in the examples. The process of this invention is also applicable to hydrocyanation of unsaturated organic compounds containing more than one carbon-carbon double bond wherein the carbon-carbon double bonds are separated from each other by at least one carbon atom. Suitable unsaturated compounds of this type include such compounds as 1,4-pentadiene, 1,5-hexadiene, 1,5,9-dodecatriene, 1,5-cyclooctadiene or 2,5-norbornadiene.

The required zerovalent nickel compounds are olefin-bonded nickel complexes of the formula Ni(PXYZ)$_2$A wherein X is OR, Y and Z are R or OR and R is an alkyl or aryl radical having up to 18 carbon atoms and the groups are so chosen that the ligand has a cone angle with an average value between 130° and 170°; wherein "A" is an unsaturated organic compound containing from 2 to 20 carbon atoms and having at least one olefinic carbon-carbon double bond of the class consisting of aliphatic and aromatic hydrocarbons and aliphatic and aromatic hydrocarbons substituted with functional groups consisting of

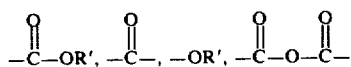

and $-NR'_2$, wherein R' is an alkyl or aryl radical having from 1 to 10 atoms, and each open bond other than that required for connection of the functional group to the olefinic radical is connected to hydrogen or an aliphatic or aromatic hydrocarbon radical and wherein the carbon-carbon double bond is separated from the aforesaid functional group by at least one carbon atom, as should be apparent from the foregoing description the olefinic unsaturation is the sole aliphatic unsaturation present.

The complexes defined above can be preformed, as in the case of ethylene[bis(tri-o-tolylphosphite)]nickel(O) or similar olefin bonded complexes, or they can be prepared in situ as is illustrated in Examples 1 to 7 wherein the coordinatively unsaturated zerovalent nickel complex Ni[P(O-o-C$_6$H$_4$CH$_3$)$_3$]$_3$ serves as the precursor for the active catalyst species. The complex HNi[P(O-o-C$_6$H$_4$CH$_3$)$_3$]$_3$CN, which is derived from reaction of hydrogen cyanide with the complex Ni[P(O-o-C$_6$H$_4$CH$_3$)$_3$]$_3$, can also serve as the precursor for the active catalyst species, as illustrated in Examples 8 and 9. The complexes can also be prepared in situ by reduction of a divalent nickel compound with a metal more electropositive than nickel. The reduction can be carried out in an organic nitrile solvent such as adiponitrile, acetonitrile, propionitrile, butyronitrile, benzonitrile or 2-methylglutaronitrile, along with an appropriate triaryl phosphite ligand. Useful nickel compounds include halide salts such as nickel chloride, nickel bromide or nickel iodide as well as nickel salts of carboxylic acids, sulfonic acids or sulfuric acid. Suitable reducing metals, that is, metals more electropositive than nickel in the saturated aliphatic dinitrile solvent, include Na, Li, Mg, Ca, Ba, Sr, Ti, V, Fe, Co, Cu, Zn, Cd, Al, Ga, In, Sn, Pb and Th. The complexes can also be prepared by treating an organonickel compound with a suitable ligand. In the course of a typical hydrocyanation, there may be present, in addition to the species Ni(PXYZ)$_2$A, an N-bonded nitrile complex of the formula Ni(PXYZ)₃R²CN, X, Y and Z being defined above and wherein R²CN corresponds to the organic nitrile produced by reaction of hydrogen cyanide on the particular unsaturated compound. The R²CN moiety may also be an organic nitrile such as acetonitrile, propionitrile, butyronitrile or benzonitrile being employed as a solvent in the reaction.

The R groups in a given trivalent phosphorus ester ligand PXYZ may be cojoined and may be the same or different and are so chosen as stated above that the ligand has a cone angle with average value between 130° and 170°, preferably between 140° and 165°. The cone angle is determined as described by C. A. Tolman, *J. Am. Chem. Soc.* 92 2956 (1970). The aryl groups may be substituted with alkyl, halogen or other groups provided the groups do not interfere with the catalyst function. Mixed ligands can be used. Typical trivalent phosphorus ester ligands include tri-o-tolyl phosphite (cone angle 141°) di-o-tolyl phenyl phosphonite (cone angle 142°) and tri-(2,5-xylyl) phosphite (cone angle 144°). Other suitable phosphorus ligands include tri-(2,4-xylyl)phosphite, tri-(o-phenylphenyl)phosphite, diphenyl phenyl phosphonite and phenyl diphenyl phosphinite. The aryl groups of PXYZ may be substituted with alkoxy or other groups provided the groups do not interfere with the catalyst function. Mixed phosphorus ligands can be used.

A promoter may be used to improve the activity of the catalyst for the hydrocyanation reaction and to control distribution of the products. The promoter generally is a cationic form of the metal selected from the class of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, palladium, thorium, iron and cobalt. Among these the cations of zinc, cadmium, titanium, tin, chromium, iron and cobalt are preferred. Suitable promoters of this type are salts of the metals listed above and include aluminum chloride, zinc chloride, cadmium iodide, titanium trichloride, titanium tetrachloride, zinc acetate, ethyl aluminum dichloride, chromic chloride, stanous chloride, zinc iodide, nickel chloride, cerous chloride, cobaltous iodide, cadmium chloride, molybdenum dichloride, zirconium chloride, thorium chloride, ferrous chloride and cobaltous chloride. The anion portion of the compound may be a halide such as chloride, bromide and iodide, anions of lower fatty acids of from 2 to 7 carbon atoms, $HPO_3^{--}$, $H_2PO_2^-$, $CF_3COO^-$, $C_7H_{15}OSO_2^-$, $SO_4^{--}$, etc.

Also useful as a promoter in the hydrocyanation reaction described above are the borohydrides and organo boron compounds of the formulae $B(R^5)_3$ and $B(OR^5)_3$ wherein $R^5$ is of the class consisting of aryl radicals of from 6 to 18 carbon atoms, alkyl radicals of from 1 to 7 carbon atoms and alkyl radicals of from 1 to 7 carbon atoms substituted with a cyano radical. Generally, the case where $R^5$ is phenyl or phenyl substituted with an electronegative radical is preferred, as in the structure

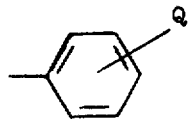

wherein Q is of the class consisting of —H, —F and —CF₃.

The preferred borohydrides are the alkali metal borohydrides and the quaternary ammonium borohydrides particularly the tetra (lower alkyl) ammonium borohydrides and borohydrides of the formula $B_nH_{n+4}$ where n is an integer of from 2 to 10, and $B_mH_{m+6}$ where m is an integer of from 4 to 10. Of these, sodium borohydride and potassium borohydride are especially preferred.

The promoter acts to improve catalyst life (moles of product/mole of nickel complex) and, in certain cases, the yield and rate. The amount of promoter used generally can be varied from about 1:16 to 50:1 molar ratio of promoter to catalyst. The promoter may be used according to several techniques. Thus, while at least some of the promoter may be added to the reaction mixture at the start of the reaction, additional amounts may be added at any point in time during the reaction.

It is believed that the organoboron compounds of the present invention have three levels of activity as follows. First, the principal most active promoter which is believed to have the formula $B(R^5)_3$ wherein $R^5$ has the meaning defined above. Second, intermediate boron hydrides of the formula $B_nH_{n+4}$ or $B_mH_{m+6}$ which, it is believed, reacts with the olefin being hydrocyanated to form an organo boron compound of the formula $B(R^5)_3$ wherein $R^5$ is derived from the olefin. For example, when $B_2H_6$ is the boron hydride and 3-pentenenitrile is the olefin the principal promoter is believed to be

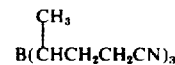

and other isomers. Third, an alkali metal borohydride or quaternary ammonium borohydride which when used as the promoter is believed to form an intermediate borohydride $B_nH_{n+4}$ or $B_mH_{m+6}$ in the reaction mixture which, in turn, forms a borane $B(R^5)_3$ which becomes the principal promoter.

The hydrocyanation reaction can be carried out by charging a reactor with all of the reactants or the reactor is charged with a catalyst or catalyst components, the unsaturated organic compound, the promoter and whatever solvent is to be used and hydrogen cyanide gas is swept over the surface of the reaction mixture or bubbled through the reaction mixture. Alternately, the hydrogen cyanide may be introduced in liquid form or in the form of the corresponding cyanohydrin. If desired, when using a gaseous unsaturated organic compound, the hydrogen cyanide and the unsaturated organic compound may be fed together into the reaction medium. Another technique is to charge the reactor with a catalyst, promoter, hydrogen cyanide and solvent to be used and thereafter feed the unsaturated compound slowly to the reaction mixture. The molar ratio of unsaturated compound to catalyst generally is varied from about 1:2 to 2000:1 unsaturated compound to catalyst. The reaction medium is generally agitated such as by stirring or shaking.

In some instances it may be desirable to use an excess of the ligand (PXYZ) when carrying out the hydrocyanation reaction. The excess ligand may be added to the reactor along with the preformed complex, or in the case of in situ preparation of the complex an excess of the ligand may be introduced from which the complex will then be formed. The amount of excess ligand may range from a one-mole excess over that required for the zerovalent nickel complex up to 30 moles excess or more, the top limit being governed mainly by economic considerations.

The hydrocyanated product can be recovered by conventional techniques such as by distillation or by crystallization of the product from solution.

The hydrocyanation reaction can be carried out with or without a solvent. The solvent should be liquid at the reaction temperature and inert toward the reactants. Generally such solvents are hydrocarbons such as benzene, toluene or xylene or nitriles such as acetonitrile, propionitrile, butyronitrile or benzonitrile. Mixtures of the above-named solvents can also be employed.

The exact temperature which is preferred is dependent to a certain extent on the particular catalyst being used, the particular unsaturated compound being reacted and the desired rate. Generally temperatures of −50°C. to 150°C. can be used. The reaction can be carried out at pressures from about 0.05 to about 100 atmospheres. The nickel complexes of this invention permit hydrocyanation at high rates with low byproduct formation.

The nitriles formed by the present invention are useful as chemical intermediates to form the corresponding acids and amines which are conventional commercial products.

DESCRIPTION OF PREFERRED EMBODIMENTS

In the preferred embodiments of this invention the hydrocyanation is carried out at a temperature in the range of about −15°C. to about 75°C. and at a pressure in the range of about 0.05 to about 10 atmospheres.

The preferred nickel complexes are those wherein the "R" groups of the phosphite ester ligands are ortho tolyl. The preferred promoters are cations of zinc, aluminum, cadmium, titanium, tin, chromium, iron and cobalt and boron compounds such as triphenyl borane.

The invention is further illustrated in the examples to follow. Examples 1 to 7 illustrate in situ preparation of the complex by addition of $Ni[P(O-o-C_6H_4CH_3)_3]_3$ to the reactor, where the zerovalent nickel complex described above is rapidly transformed to species represented by $Ni[P(O-o-C_6H_4CH_3)_3]_2[A]$, A being defined as in the preceding description.

EXAMPLE 1

Hydrocyanation of $C_6H_5NHCH_2CH=CH_2$

A 50 ml. three-necked, round-bottom glass flask fitted with a reflux condenser connected to a Dry Ice trap, a gas inlet above liquid level and a magnetic stirrer was set up in an oil bath at about 70°C. The flask was purged with dry, deoxygenated nitrogen and charged with 2.0 g. of $Ni[P(O-o-C_6H_4CH_3)_3]_3$*, 0.5 g. of $AlCl_3$ and 10 ml. of $C_6H_5NHCH_2CH=CH_2$. A stream of dry, deoxygenated nitrogen gas was bubbled through 17 ml. of liquid hydrogen cyanide contained in a 50 ml. flask, cooled in an ice bath. The nitrogen flow was adjusted to give a gaseous hydrogen cyanide feed rate equivalent to 0.3 ml. (as measured at 0°C.) of liquid hydrogen cyanide per hour. The resulting gas mixture was passed through a bed of phosphorus pentoxide to eliminate traces of moisture and then was swept across the surface of the reaction mixture in the flask. After 20 hours, the reaction was shut down.

*Prepared as described by L. W. Gosser and C. A. Tolman, *Inorganic Chemistry*, 9, 2350 (1970).

The infrared spectrum of the crude product showed an absorption band at 2240 cm$^{-1}$ showing the presence of an organic nitrile resulting from the addition of HCN to the double bond of $C_6H_5NH—CH_2CH=CH_2$.

EXAMPLES 2–7

The hydrocyanations in these examples (Table I) were carried out following the procedure described in Example 1. In Example 3 toluene in the amount of 80 ml. was added as solvent.

TABLE I

| Ex. | Olefin | Catalyst Precursor | Promoter | HCN Rate | Time | Temp. | Product |
|---|---|---|---|---|---|---|---|
| 2 |  20 ml. | $Ni[P(O-o-C_6H_4CH_3)_3]_3$- 2.0 g. | $ZnCl_2$- 0.5 g. | 0.6 ml/hr | 21 hrs. | 25°C. | Shows nitrile; IR bond at 2240 cm$^{-1}$ |
| 3 | 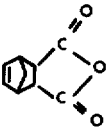 10 g. | '' | '' | 0.4 ml/hr | 20 | 70°C. | '' |
| 4 | $C_6H_5OCH_2CH=CH_2$ 20 ml. | '' | $B(C_6H_5)_3$ 1.0 g. | 0.6 ml/hr | 20.5 | 25°C. | '' |
| 5 | 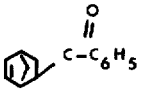 20 ml. | '' | — | 1.0 ml/hr | 20 | 70°C. | '' |
| 6 | 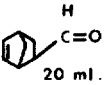 20 ml. | '' | $SnCl_2$ | 1.1 ml/hr | 20 hrs. | 50°C. | '' |

TABLE I-continued

| Ex. | Olefin | Catalyst Precursor | Promoter | HCN Rate | Time | Temp. | Product |
|---|---|---|---|---|---|---|---|
| | | | 0.6 g. | | | | |
| 7 | (benzoate methyl ester) | " | CoCl$_2$ 0.25 g. | 0.6 ml/hr | 21 hrs. | 90°C | " |

EXAMPLE 8

Hydrocyanation of Ethylene

An amount of 0.08 g. of Ni[P(O-o-C$_6$H$_4$CH$_3$)$_3$]$_3$ in the form of a partly dissolved red solid in a 75/25 toluene/methylene choride solvent was placed in an NMR tube, the tube was cooled in a Dry Ice/trichloroethylene bath and 8 μl of liquid hydrogen cyanide was injected by syringe. Upon shaking the tube the red solid dissolved to give a homogeneous yellow solution. NMR measurements at −50°C. showed transformation to the complex NHi[P(O-o-C$_6$H$_4$CH$_3$)$_3$]$_3$CN. The tube was further cooled in liquid nitrogen, 5 ml. of gaseous ethylene was added and the tube thereafter was permitted to warm to ambient temperature. Measurements (NMR) at −25°C. showed evidence of propionitrile formation; increased formation of propionitrile was evidenced at 0°C.

EXAMPLE 9

Hydrocyanation of Propylene

Following the procedure of Example 8, the nickel complex HNi[P(O-o-C$_6$H$_4$CH$_3$)$_3$]$_3$CN was reacted with propylene. At a temperature of 0°C. NMR measurements showed the presence of unreacted propylene and hydrogen cyanide as well as linear and branched butyronitriles in ratio of 75%/25%. On warming the mixture to 25°C. NMR measurements showed no evidence of unreacted propylene and hydrogen cyanide, with formation of linear and branched butyronitrile in ration of 70%/30%.

In further experiments, reaction of propylene with the above nickel complex in the presence of AlCl$_3$ in a 10 minute run at 25°C. gave butyronitrile with 72% being the linear isomer; with triphenyl borane in a 60 minute run at 25°C., the proportion of linear butyronitrile was 89%.

EXAMPLE 10

Hydrocyanation of Styrene

To a 100 ml, nitrogen sparged round-bottom three-neck flask was charged 25 ml of styrene, 2.0 g. of tris(-tri-o-tolylphosphite)nickel, 4.0 ml of tri-o-tolylphosphite and 0.5 ml of a 10% solution of zinc chloride in ether.

The reaction mixture was stirred at 22°C. (ambient temperature) for two hours while hydrogen cyanide was admitted through a nitrogen swept bubbler at 1 ml/hour.

Infrared analysis of the product mixture showed a new band at 2240 cm$^{-1}$ indicative of 3-phenylpropionitrile.

EXAMPLE 11

Hydrocyanation of 2,5-Norbornadiene

To a 100 ml, nitrogen flushed round-bottom, three-neck flask was charged 25 ml of 2,5-norbornadiene, 2.0 g. of tris(tri-o-tolylphosphite)nickel and 4.0 ml of tri-o-tolylphosphite.

The reaction mixture was stirred at 22°C. (ambient temperature) for two hours while hydrogen cyanide was admitted through a nitrogen swept bubbler at 1 ml/hour.

Infrared analysis of the product mixture showed a new band at 2240 cm$^{-1}$ indicative of 2-cyanobornene.

We claim:

1. In a process of hydrocyanating an olefinic unsaturated organic compound containing from 2 to 20 carbon atoms and having at least one olefinic carbon-carbon double bond, the olefinic unsaturated organic compound being selected from the group consisting of (a) monoolefinic aliphatic and aromatic hydrocarbons and monoolefinic aliphatic and aromatic hydrocarbons containing a functional group of the group consisting of —OR',

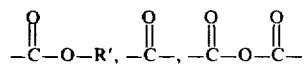

and —NR'$_2$ wherein R' is selected from group consisting of hydrogen, alkyl and aryl radicals having up to 10 carbon atoms and each open bond other than that required for connection of the functional group to the olefinic radical is connected to a radical of the group consisting of hydrogen, aliphatic and aromatic hydrocarbon radicals, wherein the carbon-carbon double bond is separated from the aforesaid functional group by at least one carbon atom, and (b) polyoelfinic aliphatic compounds wherein the carbon-carbon double bonds are separated from each other by at least one carbon atom;

the improvement which comprises reacting the unsaturated compound with hydrogen cyanide in the presence of an olefin-bonded zerovalent nickel complex of the formula Ni(PXYZ)$_2$A; wherein X is OR, Y and Z are R or OR and R is an alkyl or aryl radical having up to 18 carbon atoms;

wherein the R radicals of a given PXYZ ligand may be cojoined, may be the same or different and are so chosen that the ligand has a cone angle with an average value between 130° and 170°;

wherein A is an unsaturated organic compound containing from 2 to 20 carbon atoms and having at least one olefinic carbon-carbon double bond, the unsaturated organic compound being selected from the group consisting of (a) monoolefinic aliphatic and aromatic hydrocarbons and monoolefinic and aromatic hydrocarbons containing a functional group, the functional group being as defined above, and (b) polyolefinic aliphatic compounds wherein the carbon-carbon double bonds are separated from each other by at least one carbon atom; at a temperature in the range of −50°C. to 150°C. and at a pressure in the range of about 0.05 to about 100 atmospheres, the molar ratio of the unsaturated compound to the complex being from 1:2 to 2000:1; and recovering an organic cyano compound wherein said olefinic unsaturation is the sole aliphatic unsaturation present.

2. The process of claim 1 wherein the olefinic unsaturated organic compound is of the group consisting of monoolefinic aliphatic and aromatic hydrocarbons and monoolefinic aliphatic and aromatic hydrocarbons containing a functional group, the functional group being as defined in claim 1.

3. The process of claim 2 wherein PXYZ is a triaryl phosphite.

4. The process of claim 3 wherein the triaryl phosphite is tri-o-tolyl phosphite.

5. The process of claim 4 wherein there is present, in addition to the catalyst complex, as a promoter a cation of a metal selected from the group consisting of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, thorium, iron, and cobalt.

6. The process of claim 5 wherein the promoter is a cation of a metal selected from the group consisting of zinc, aluminum, cadmium, titanium, tin, chromium, iron and cobalt.

7. The process of claim 6 wherein the anion portion of the compound containing the metal cation is selected from the group consisting of chloride, bromide, iodide, anions of lower fatty acids of from 2 to 7 carbon atoms, $HPO_3^-$, $H_2PO_2^-$, $CF_3COO^-$, $C_7H_{15}OSO_2^-$ and $SO_4^{--}$.

8. The process of claim 1 wherein in addition to the catalyst complex, olefinic unsaturated organic compound and hydrogen cyanide there is introduced a boron compound of the group consisting of alkali metal and tetra (lower alkyl) ammonium borohydrides, borohydrides of the structure $B_nH_{n+4}$ wherein $n$ is an integer of from 2 to 10 and $B_mH_{m+6}$ wherein $m$ is an integer of from 4 to 10 and organoboron compounds of the formula $B(R^5)_3$ and $B(OR^5)_3$ wherein $R^5$ is of the group consisting of aryl radicals of from 6 to 18 carbon atoms, lower alkyl radicals and cyano substituted lower alkyl radicals.

9. The process of claim 8 wherein the organoboron compound is triphenyl borane.

10. The process of claim 4 wherein there is present also an N-bonded nitrile complex of the formula $Ni(PXYZ)_3R^2CN$, wherein PXYZ is tri-o-tolyl phosphite and $R^2$ CN is the organo nitrile product by reaction of hydrogen cyanide with the unsaturated organic compound.

11. The process of claim 1 wherein the olefinic unsaturated organic compound is a polyolefinic aliphatic compound wherein the carbon-carbon double bonds are separated from each other by at least one carbon atom.

12. The process of claim 11 wherein PXYZ is tri-o-tolyl phosphite.

* * * * *